United States Patent [19]

Gilliland

[11] Patent Number: 4,870,248
[45] Date of Patent: Sep. 26, 1989

[54] ARC WELDER WITH IMPROVED ARC STRIKING CAPABILITY

[76] Inventor: Malcolm T. Gilliland, 310 Pine Valley Rd., Marietta, Ga. 30067

[21] Appl. No.: 181,985

[22] Filed: Apr. 15, 1988

Related U.S. Application Data

[63] Continuation-in-part of Ser. No. 62,543, Jun. 12, 1987, which is a continuation-in-part of Ser. No. 791,224, Oct. 25, 1985, Pat. No. 4,716,274.

[51] Int. Cl.$^4$ .............................................. B23K 9/06
[52] U.S. Cl. .............................. 219/130.4; 219/130.21; 219/137 PS
[58] Field of Search ............. 219/130.4, 130.21, 130.5, 219/137 PS

[56] References Cited

U.S. PATENT DOCUMENTS

| | | | |
|---|---|---|---|
| 4,109,130 | 8/1978 | Oku ................................. | 219/130.5 |
| 4,560,857 | 12/1985 | Segawa et al. .................... | 219/130.5 |
| 4,672,175 | 6/1987 | Niven ............................... | 219/130.4 |

*Primary Examiner*—Clifford C. Shaw
*Attorney, Agent, or Firm*—Jones, Askew & Lunsford

[57] ABSTRACT

A pulse type arc welder with improved arc starting characteristics. An output voltage level sensor (2017) monitors the output voltage to determine whether the arc has been struck. If the arc has not been struck, a first oscillator (2000) gates a second, higher frequency oscillator (2002) so that the input to the driver (2010) is a chopped, pulsed, high duty cycle waveform. Also, the bandwidth of the output current level sensor (2012) is reduced so that the high value, short lived arc starting transient current does not cause the output current level sensor (2012) to improperly shut down the driver (2010). Additional current limiting protection is provided during this period since the high chopping frequency causes the reactor (2010a) to have a high impedance. After the arc has been struck, the output voltage will drop to the arc sustaining voltage and the output voltage level sensor (2017) will de-energize relay (2003). The first oscillator (2000) then provides the driver (2010) with an input signal having the characteristics selected for the particular welding operation. Also, the bandwidth of the output current level sensor (2012) is restored to its full value.

50 Claims, 7 Drawing Sheets

ARC WELDER WITH IMPROVED ARC STRIKING CAPABILITY

This is a continuation-in-part of U.S. patent application Ser. No. 062,543, filed June 12, 1987, by Malcolm T. Gilliland, entitled "Improved Arc Welding System", which is a continuation-in-part of U.S. patent application Ser. No. 791,224, filed Oct. 25, 1985, by Malcolm T. Gilliland, entitled "Distributed Station Welding System", now U.S. Pat. No. 4,716,274, issued Dec. 29, 1987.

TECHNICAL FIELD

The present invention relates to pulse type arc welders and particularly discloses a pulse type arc welder which has a higher striking voltage and an improved arc striking capability.

BACKGROUND OF THE INVENTION

The present invention describes improvements to the weld selector stations described in the above U.S. Patent and the above U.S. patent application. The improvements are also applicable to other pulse arc type electronic welders.

In most welding applications, it is necessary to start the arc between a welding torch, electrode, or a rod and the workpiece by bringing the rod into very close proximity to, or into contact with, the workpiece. When an arc is started by contact or near contact with the workpiece, the initial arc content can be very high and, if over-current protection is provided, can trip the over-current protector and shut down the welder, thus necessitating restarting the arc, or, if over-current protection is not provided, the initial arc currents may be high enough to damage the welding unit or the workpiece.

Welding machines have been created for starting the arc without rod/workpiece contact or near contact. For example, see U.S. Pat. No. 4,672,175, dated June 9, 1987, issued to Robert W. Niven, and entitled "Arc Starter For Welder". However, most electronic welders do not use a high voltage arc starting apparatus and the output voltage which can be used for starting the arc is typically limited to the D.C. power supply voltage, which is generally about 80 volts.

Furthermore, in electronic pulse arc type welders, the output voltage is not continuous but is pulsed so that the average output voltage is substantially less than the D.C. power supply voltage. This lower average output voltage increases the difficulty incurred in properly starting the arc. Therefore, there is a need for a pulse arc type welder which provides an increased average output voltage during arc striking conditions.

Furthermore, at the instant when the arc is ignited, especially in those circumstances where the rod was initially touching the workpiece, the small arc gap will allow an extremely large arc current to flow if some means of protection is not provided. In some cases, current sensing circuitry is provided which interrupts the output if the peak output current exceeds a predetermined value. This has the advantage of protecting the drive circuits. However, this has the disadvantage that, if the arc is interrupted too long, the arc will be quenched and it will be necessary to reexecute the arc striking operation. In other types of systems, the average output current is measured and used to provide feedback to pulse width modulation circuitry so that the large starting current causes a reduction in the width of the output pulses. However, this type of feedback circuitry is generally designed for maintaining an arc once it has been created, has a very limited range of control over the pulse widths, and generally provides inadequate control over the starting arc current.

Therefore, there is a need in the welding art for an arc starting circuit for an electronic pulse arc type welder which provides an increased output voltage during arc striking conditions. Furthermore, there is a need in the welding art to provide an arc starter circuit which provides for the control and limiting of the initial arc starting surge current.

SUMMARY OF THE PRESENT INVENTION

The present invention provides an electronic welder with improved arc starting and current controlling characteristics. Generally described, the present invention is an electronic arc welder which provides, for arc imitation, an increased output voltage and, after the arc has been initiated, automatically switches to the pulse characteristics selected by the welder for the particular welding job at hand.

Also generally described, the present invention is an electronic welder which has provisions for limiting the output current to a safe value during the arc starting period.

More particularly described, the present invention provides a method and an apparatus for overriding the operators selection during the arc starting period and, instead, providing a pulsed, chopped output signal with a high duty cycle.

Also more particularly described, the present invention provides a method and apparatus for limiting the arc starting current by chopping the output signal at a very high rate so that the smoothing reactor is not saturated and the reactance provided by the smoothing reactor is sufficiently high to limit the rate of increase of the arc current.

Also more particularly described, the present invention provides a method and apparatus for determining whether or not the arc has been struck so that, prior to the arc being struck, the output of the welder has a first set of characteristics and, after the arc has been struck, the output of the welder has a second set of characteristics which were selected by the user or operator.

Also more particularly described, the present invention provides a method and apparatus for monitoring the output voltage or the output current to determine whether or not the arc has been struck so that, prior to the arc being struck, the output of the welder has a first set of characteristics and, after the arc has been struck, the output of the welder has a second set of characteristics which were selected by the user or operator.

In setting the parameters for a welding machine for striking an arc, two opposing requirements are present: one is for an increased average output voltage to help strike the arc; and the other is for protection against excessive arc striking transient currents. The first requirement can be met by increasing the output pulse width or duty cycle and/or the pulse repetition rate. This causes the output voltage to tend toward a constant DC voltage, thereby increases the average output voltage. However, this also increases the likelihood that the reactor will become saturated, thereby reducing the protection against the arc striking transient currents. The second requirement can be met by chopping the output waveform at a high rate. This reduces the likelihood that the reactor will saturate and improves the protection against arc starting starting transient currents. However, it will be appreciated that the chopping action tends to reduce the average output voltage.

In the preferred embodiment, these two requirements are reconciled by combining the above methods, i.e., increasing the output duty cycle or pulse width, increasing the output repetition rate, and chopping the output waveform at a high rate. The increased pulse width and pulse repetition rate tend to increase the output voltage while the chopping action increases the protection afforded by the reactor, even though the chopping action places an upper limit on the average output voltage.

It will be appreciated that the average output voltage is a product of the pulse with, the pulse repetition rate, and the duty cycle of the chopping waveform. Therefore, if an unchopped output has a pulse width T1 and a pulse repetition rate F1, and a chopped output has a pulse width $2 \times T1$, a pulse repetition rate F1 and a chopping waveform duty cycle of fifty percent, then the average output voltage of the unchopped output will be the same as the average output voltage of the chopped output. However, the chopping action provides increased protection against starting transient currents, and the average output voltage can be further increased by increasing the pulse repetition rate. For this reason, in the preferred embodiment, the pulse width and pulse repetition rate are increased and the output is chopped during arc striking.

In the preferred form of the present invention, the output voltage is monitored to determine whether it is an arc sustaining voltage, in which case the arc has already been struck, or is substantially higher than the arc sustaining voltage, in which case the arc has not yet been struck. If the arc has been struck, the pulse repetition rate, pulse width, chopping frequency, and/or chopper pulse width are the values selected by the operator. However, if the arc has not yet been struck, these characteristics are set instead to a predetermined set of values. The resulting higher output voltage assists in starting the arc. Furthermore, the high chopping rate prevents the reactor from saturating and causes the reactor to have a very high impedance and limits the arc starting current. Also, in the preferred form of the present invention, since the arc starting current is limited, to a degree, by the chopping frequency and the impedance of the reactor, the bandwidth of the output current sensor is reduced so that the output current sensor does not improperly turn off the arc welder by responding to the high value, short lived arc starting transient currents.

Therefore, it is an object of the present invention to provide an electronic pulse type arc welder which has an increased arc starting voltage.

It is another object of the present invention to provide an electronic pulse type arc welder which limits the peak arc starting currents.

It is another object of the present invention to provide an electronic pulse type arc welder which provides the output voltage with a first set of characteristics, preferred for starting the arc, prior to the arc being struck and which provides the output voltage with a second set of characteristics, desirable for maintaining the arc and conducting the welding operation, after the arc has been struck.

That the present invention achieves these and other objects and overcomes the above mentioned limitations of the prior art will be appreciated from the following detailed description of the preferred embodiment.

DETAILED DESCRIPTION

Figure 1:
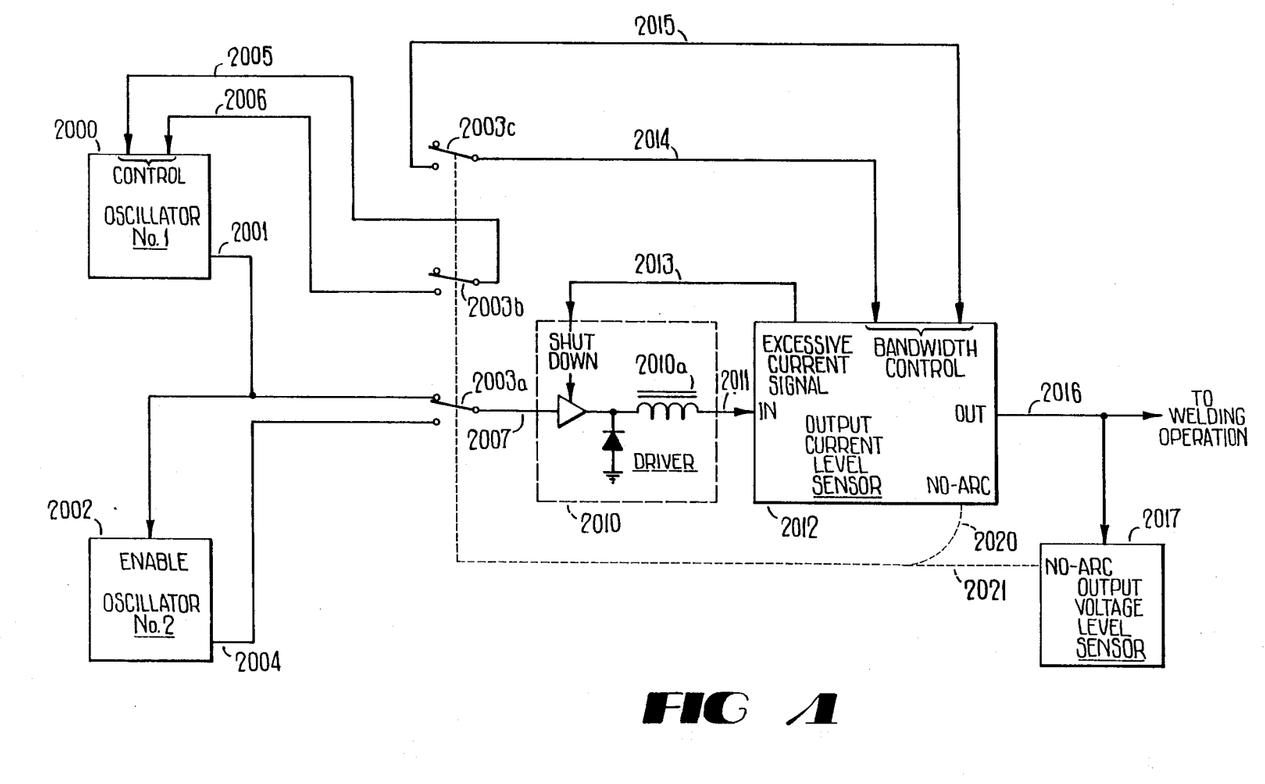
FIG. 1 is a block diagram of the preferred embodiment of the present invention.

Turning now to the drawing, in which like numerals represent like components through the several figures, the preferred embodiment of the present invention will be described. FIG. 1 is a block diagram of the preferred embodiment of the present invention. The embodiment shown may be considered as having two operating states: before an arc is struck; and after an arc is struck. The voltage on conductor 2016, before an arc has been struck, will be, to a large degree, the open circuit output voltage of the driver circuit 2010. However, after the arc has been struck, the voltage on conductor 2016 will essentially be the arc voltage, which is typically about 20 volts. The voltage on conductor 2016 is used, in a positive feedback type configuration, to enhance the arc striking capabilities of an electronic welder. More precisely, if the voltage on conductor 2016 is above a predetermined value then this is considered to be an indication that the arc has not been struck and steps are taken to raise the output voltage on conductor 2016 to a higher level. Conversely, if the voltage on conductor 20161 is below a predetermined value, then the circuit which attempted to drive conductor 2016 to the higher level is disabled.

The voltage on conductor 2016 is monitored by an output voltage level sensor 2017. Sensor 2017 has a first state when the voltage on conductor 2016 is above a predetermined voltage value and a second state when the voltage on conductor 2016 is below that predetermined value. Sensor 2017 controls the state of a relay 2003, shown as a 3PTDT relay. Relay 2003 is shown in its de-energized position, that is, the position in which it would be after an arc has been struck.

The output of a first oscillator 2000, which is preferably a low frequency oscillator or pulse width modulator, is connected by conductor 2001 to the normally closed contact of relay section 2003a and to the ENABLE input of a second oscillator 2002 or pulse width modulator, preferably having a higher oscillator frequency than the oscillation frequency of the first oscillator 2000. The output of the second oscillation 2002 is connected by conductor 2004 to the normally open contact of relay section 2003a. The center contact of relay section 2003a is connected by conductor 2007 to the input of a driver circuit 2010. The output of driver circuit 2010 is connected by conductor 2011 to the input of an output current level sensor circuit 2012 and then to the output conductor 2016. Output conductor 2016 is connected to a part of the welding operation, such as a torch (not shown). The excess current output of sensor 2012 is connected by conductor 2013 to the SHUT- DOWN input of driver circuit 2010. Whenever the output current on conductors 2011 and 2016 exceeds a predetermined value then sensor 2012 will shut down driver 2010, or reduce its driving capability, at least until the excess current condition has been corrected or allowed to dissipate.

The center contact and the normally open contact of relay section 2003b are connected by conductors 2005 and 2006, respectively, to the control input of the first oscillator 2000. In the preferred embodiment, the control input of oscillator 2000 controls the oscillation frequency or, viewed another way, the duty cycle of the output waveform of conductor 2001. The center contact and the normally open contact of relay section 2003c are connected by conductors 2014 and 2015, respectively, to the bandwidth control input of output current level sensor 2012. In the preferred embodiment, the current on conductors 2011 and 2016 is lowpass filtered before being evaluated for an excess current condition. The bandwidth control inputs of sensor 2012 control the upper cutoff frequency of the lowpass filtered input. In the preferred embodiment, a lower cutoff frequency is used before the arc has been struck and the higher cutoff frequency is used after the arc has been struck. This helps to assure that a short-lived, high peak value output current, such as when the arc is initially struck, does not cause sensor 2012 to shut down driver 2010 and extinguish the just ignited arc. However, once the arc has been struck, sensor 2012 is made more responsive to the current on conductors 2011 and 2016 such that subsequent high peak currents, such as when the troch or rod touches the workpiece, cause sensor 2012 to partially or completely shut down driver 2010, thereby protecting driver 2010.

Consider now the operation of the circuit shown. Prior to the arc being struck, the voltage on conductor 2016 will be the open circuit output voltage, which is noticeably greater than the arc sustaining voltage. If voltage sensor 2017 has a threshold voltage which is greater than the arc sustaining voltage, but less than the open circuit output voltage, then the voltage on conductor 2016 will exceed this threshold voltage and voltage sensor 2017 will energize relay 2003.

In the preferred embodiment, the first oscillator 2000 has an output characterized as a pulse having a first pulse repetition rate and a first pulse width. However, when relay 2003 is energized, the control inputs of the first oscillator 2000 are connected together and the output of oscillator 2000 has a higher pulse repetition rate, a longer pulse width, or both. The output of the first oscillator 2000 gates a second oscillator 2002. In the preferred embodiment, the second oscillator 2002 has a pulse repetition rate of 1500 pulses per second (pps). Relay 2003, in the energized position, then provides the output of the second oscillator 2002 to the input of the driver circuit 2010. It will be appreciated, at this time, that the input to the driver circuit 2010 is a chopped pulse. For example, if the output of the first oscillator 2000 is 100 pps with a fifty percent duty cycle then the output of the second oscillator 2002 will be 15 cycle bursts of a 1.5 kpps signal. The output of driver 2010 on conductor 2011 and conductor 2016 is also a chopped pulse signal. As long as the arc has not been struck, the voltage on conductors 2011 and 2016 will tend to rise to the open circuit output voltage.

However, when the arc is struck, the voltage on conductor 2016 will fall to the arc sustaining voltage, which is approximately 20 volts. This is below the threshold value of voltage sensor 2017 and therefore sensor 2017 will deenergize relay 2003. The de-energizing of relay 2003 returns the control inputs of the first oscillator 2000 to their normal (open) condition and the output of oscillator 2000 switches to the value selected for the actual welding operation. Also, relay 2003 switches the input of driver 2010 from the output of the second oscillator 2002 to the output of the first oscillator 2000. The output of driver circuit 2010 on conductors 2011 and 2016 is then the pulse waveform selected for the welding operation.

When the arc is first struck, especially if the rod (not shown) of the welding operation touches or comes extremely close to touching the workpiece, the initial current surge may be quite large. Generally, this current surge will be in excess of that which would be allowable for the actual welding operation and output current sensor 2012 would detect the excess current and attempt to partially or completely shut down driver 2010. As long as the rod is not held against the work, this initial transient will be short lived and can be ignored. Therefore, when energized, relay 2003 reduces the input bandwidth of current level sensor 2012 so that, except under extreme conditions, sensor 2012 will not respond to the initial surge current. However, after the arc has been struck, relay 2003 is de-energized and output current sensor 2012 is operated at its full bandwidth.

Since the bandwidth of current sensor 2012 is reduced during the time prior to the arc being struck, current sensor 2012 offers a reduced level of protection for driver circuit 2010. However, this is acceptable because inductor (or reactor) 2010a, which is part of driver 2010, provides additional protection. The additional protection provided by inductor 2010a arises because the input and output of driver circuit 2010 is a pulse chopped at 1.5 kHz rate. The 1.5 kHz chopping rate prevents inductors 2010a from saturating and causes inductor 2010a to have sufficient reactance to limit the magnitude and rate of change of the output current to safe values until either the transient current surge has dissipated or output current sensor 2012 has had time to respond.

In summary, the preferred invention provides a chopped pulse waveform during the pre-arc period, with reduced output current protection being provided by sensor 2012 and increased output current protection being provided by the chopping frequency and inductor 2010a. Then, after the arc is struck, oscillator 2000 provides the output frequency and pulse width desired for the particular welding operation, inductor 2010a provides reduced protection, and output current level sensor 2012 provides full protection for the driver circuit 2010. The pre-arc period and the arc period are defined by the magnitude of the output voltage on conductor 2016.

In an alternative embodiment, the pre-arc and arc periods are defined, instead, by the magnitude of the output current on conductors 2011 and 2016. If the output current is below a predetermined threshold value, for example, 10 amps, then sensor 2012 determines that the arc has not yet been struck. If the output current is above the threshold value then sensor 2012 determines that the arc has been struck. Sensor 2012 then de-energizes relay 2003, as shown by dashed line 2020. The effects of the operation of relay 2003 are the same as previously described, above. In the alternative embodiment, current sensor 2012, instead of voltage sensor 2017, drives relay 2003 and therefore voltage sensor 2017 may be eliminated or used for other purposes.

Figure 2:
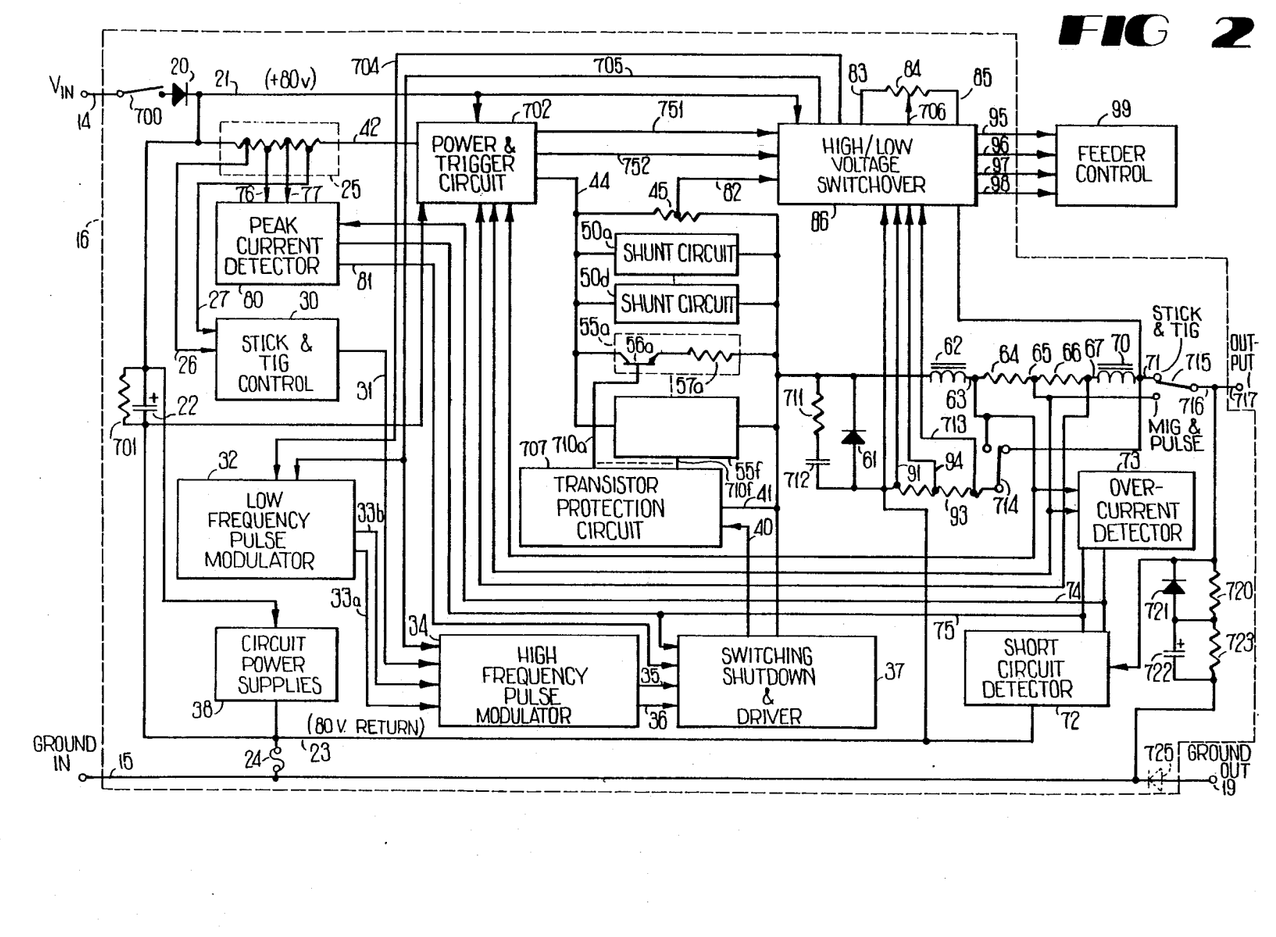
FIG. 2 is a block diagram of an electronic arc welder containing an embodiment of the present invention.

It will be appreciated that the purpose of monitoring the output voltage or the output current is to ascertain whether or not an arc has been struck and that other techniques can be used to achieve this purpose. For example, the voltage across the output transistor (components 56 of FIG. 2) is dependent upon the output current and can be used to determine whether an arc has been struck. Likewise, as is shown in FIG. 2, the current input to the welder from the 80 volt power supply can be monitored. Further, even more elaborate techniques are possible, such as using an infrared or optical detector to detect the presence of the infrared energy or light emitted by an arc.

It will be appreciated that, in some cases, the parameters selected by the operator will provide a sufficiently large pulse width and a sufficiently high pulse repetition rate to provide a high open circuit output voltage for arc starting. In these cases, the primary concern may be limiting the transient starting currents instead of increasing the arc starting voltage and therefore the parameters of oscillator 2000 may be unchanged. The result is that, for starting the arc, the output is chopped, with the chopping rate and chopping duty cycle being determined by oscillator 2002. The chopping action reduces the average output voltage available for striking the arc but the chopping action increases the protection afforded by inductor 2010a lagainst arc starting transient currents. Therefore, the present invention should be understood as encompassing cases wherein the parameters selected by the operator are unchanged except that the output is chopped during the arc starting period.

Turn now to FIG. 2, which is a block diagram of an electronic arc welder containing an embodiment of the present invention. An external DC power supply (not shown) is connected to apply a positive voltage to the $V_{IN}$ terminal and a negative voltage to the GROUND IN terminal. The output of weld selector station 16 is taken from output terminal 717 and GROUND OUT terminal 19. Weld selector station 16 has the following major components: power and trigger circuit 702, shunt circuits 50a–50d, arc sustaining resistor 45, a plurality of power transistor circuits 55a–55f, transistor protection circuit 707, high/low voltage switchover circuit 86, short circuit detector 72, over current detector 73, peak current detector 80, STICK & TIG control 30, low frequency pulse modulator 32, high frequency pulse modulator 34, switching, shutdown and driver circuit 37, and circuit power supplies 38.

The $V_{IN}$ terminal is connected by conductor 14 and on/off switch 700 to the anode of reverse protection diode 20. The anode of diode 20 is connected to conductor 21 which is the plus 80 volt supply for most of the components. Power and trigger circuit 702 provides operating power to the transistor circuits 55a–55f and also shunts down weld selector station 16 in the event of fan failure or overheating. Shunt circuits 50a–50d protect transistors 56a–56f from transient voltages when transistors 56a–56f are switching from the on condition to the off condition. In a typical welding operation, transistors 56a–56f will be rapidly switched on and off so as to maintain the desired arc and deposition rate characteristics. Arc sustaining resistor 45 provides a limited current flow when transistors 56a–56f are off so that the arc will be sustained and not quenched. The output of arc sustaining resistor 45, shut circuits 50a–50d, and transistor circuits 55a–55f are connected to output terminal 717 through a first inductor 62, a first resistor 64, and, selectively, through a second, variable resistor 66 and a second variable inductor 70. Switch 715 allows the welder to select whether resistor 66 and inductor 70 are placed in series with the output on terminal 717. Typically, resistor 66 and inductor 70 will be used when additional current limiting features are required, such as when low frequency pulse modulator 32 is set to a low frequency. Resistor 46 and inductor 70 are made variable so that, for situations wherein the combination of inductor 62 and resistor 64 provides insufficient current limiting but the combination of inductors 62 and 70 and resistors 64 and 66 provide too much current limiting, resistor 66 and inductor 70 may be adjusted to provide a desired degree of current limiting. This allows the welder to adjust resistor 66 and inductor 70 and position switch 715 to obtain the arc characteristic most desirable for the type of welding being conducted.

Flywheel diode 61 protects transistors 56a–56f from reverse voltages caused by inductor 62 and/or inductor 70 and, by conducting and blowing fuse 24, protects the weld selector station 16 from the inadvertent application of the negative power supply lead to output terminal 717. A 2.5 ohm resistor 711 and a 0.22 microfarad capacitor 712, connected in series, are placed in parallel with flywheel diode 61. Resistor 711 and capacitor 712 perform two functions: acting as a snubber circuit to protect flywheel diode 61; and, when weld selector station 16 is first turned on, conducting a sufficient amount of current through arc sustaining resistor 45 to trigger peak current detector 80. When peak current detector 80 is triggered, it shuts down some of the circuits of station 16 for three minutes. The components of weld selector station 16 are therefore allowed a three minute time to stabilize. Also, in the event of a peak current in excess of the preset value, weld selector station 16 is shut down for a three minute period to allow transistors 56a–56f and other circuits to cool down to normal operating temperature.

A 1,000 ohm resistor 701 is placed in parallel with capacitor 22. Resistor 701 provides discharge path for capacitor 22 in the event that power is turned off via switch 700, or interrupted via the blowing of fuse 24. Resistor 701 is added as a safety feature and does not otherwise affect the operation of weld selector station 16.

Connected between output terminal 717 and ground in conductor 15 is a striking assist circuit composed of two series circuits. The first series circuit is the combination of reverse biased diode 721 in parallel with 10 ohm resistor 720. The second series circuit is 30,000 microfarad capacitor 722 in parallel with 1,000 ohm bleeder resistor 723. The striking assist circuit insures a good initial strike and arc, even when the tip of the welding rod is dirty or deformed, by providing a large current surge at the instant the arc is struck. Prior to the arc being struck, capacitor 722 charges through resistor 720 to the voltage on output terminal 717, nominally 80 volts. When the arc is struck, capacitor 722 discharges through diode 721 and the arc. Because of the size of capacitor 722, the initial current surge, when the arc is first struck, is sufficiently large to disintegrate any dirt or deformities on the welding rod and also prevents the arc from starting and them immediately quenching due to irregularities on the work surface. The striking assist circuit, other than assisting in striking the arc, does not otherwise affect the operation of station 16. Bleeder resistor 723 provides, for safety purposes, an alternate discharge path for capacitor 722.

Optional diode 725, shown in phantom, is not necessary for the operation of selector station 16 but provides an additional feature to protect against the misapplication of the supply voltage to the weld selector station 16. If, for example, the negative supply lead is inadvertently connected to the GROUND OUT terminal 19 and the positive supply lead connected to the $V_{IN}$ terminal, the GROUND IN terminal or output terminal 717, diode 725 will be reversed biased and prevent this incorrect application of the supply voltage from adversely affecting the welding power supply or weld selector station 16.

With the exception of the improvement provided by the present invention, the basic construction and operation of the welder of FIG. 2, and its associated circuits, are as described in the above mentioned U.S. Pat. No. 4,716,274 and the above mentioned U.S. patent application Ser. No. 062,543, both of which are fully incorporated herein by reference, as if completely set out herein.

Figure 3:
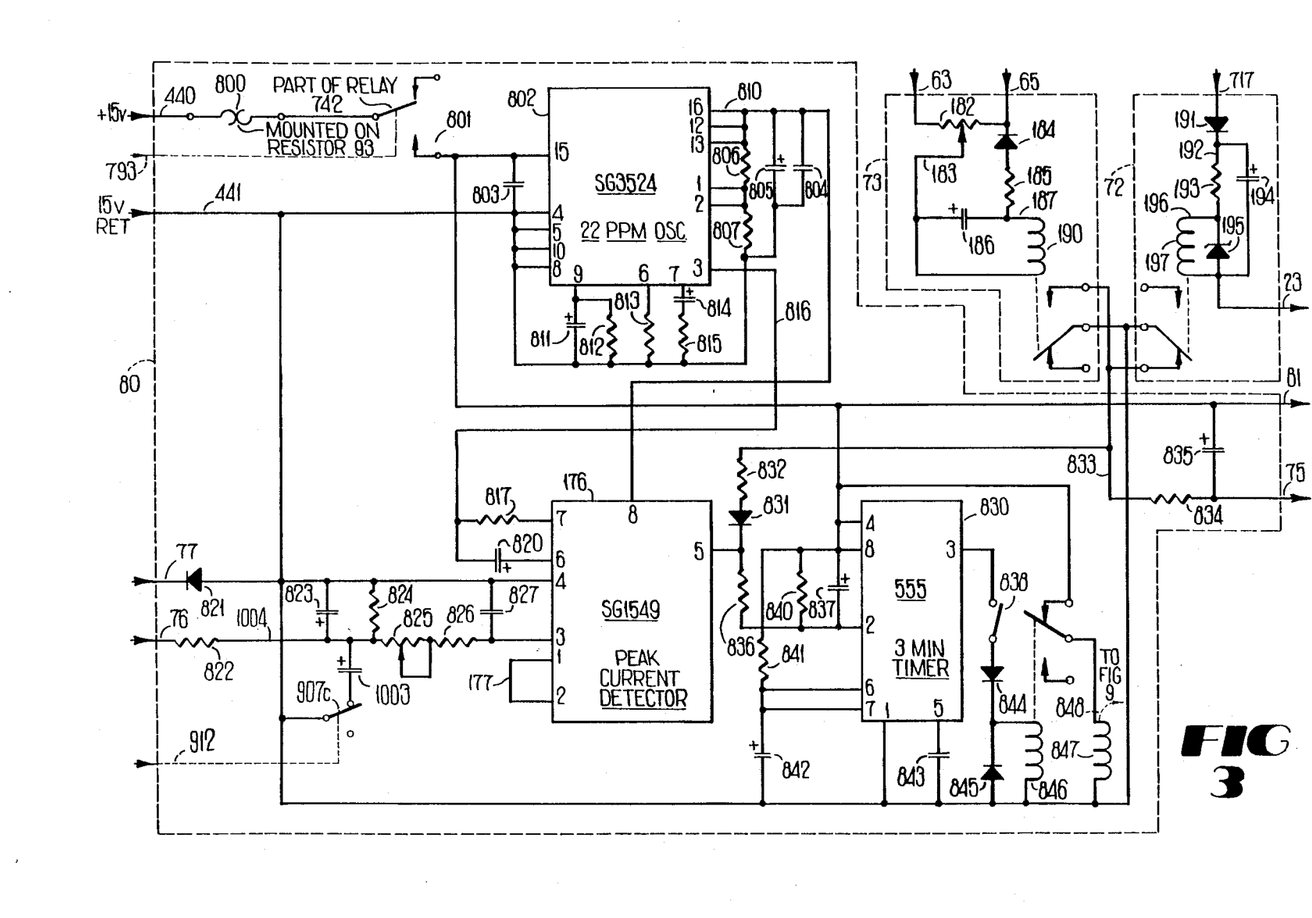
FIG. 3 is a schematic diagram of the peak current detector.

Turn now to FIG. 3 which is a schematic diagram of the peak current detector 80, short circuit detector 72, and over current detector 73. The basic construction and operation of these circuits are the same as described in U.S. Pat. No. 4,716,274 and U.S. patent application Ser. No. 062,543. The difference is the addition of section C of switch 907 and the addition of capacitor 1003. In the preferred embodiment, resistors 822 and 824 have values of 470 ohms, capacitor 823 has a value of 220 microfarads, and capacitor 1003 has a value of 500 microfarads. These values are not critical and other values, higher and lower, may be used depending upon the range of peak currents to be sensed and the rise and fall times of the peak current transients. The positive end of capacitor 1003 is connected to conductor 1004. The negative end of capacitor 1003 is connected to the normally closed contact of switch section 907c. The center contact of switch section 907c is connected to conductor 441. When switch 907 is in the position shown, capacitor 1003 is placed in parallel with capacitor 823. Capacitors 823 and 1003, and resistors 822 and 824 form a lowpass filter so that integrated circuit 176 does not respond as rapidly to transient peak current conditions. When switch 907c is in the other position, capacitor 1003 is removed from the circuit and the bandwidth is then determined by capacitor 823 and resistors 822 and 824. This still forms a lowpass filter but has a higher cutoff frequency than when capacitor 1003 is present. This allows integrated circuit 176 to respond more rapidly to output current transients.

Figure 4:
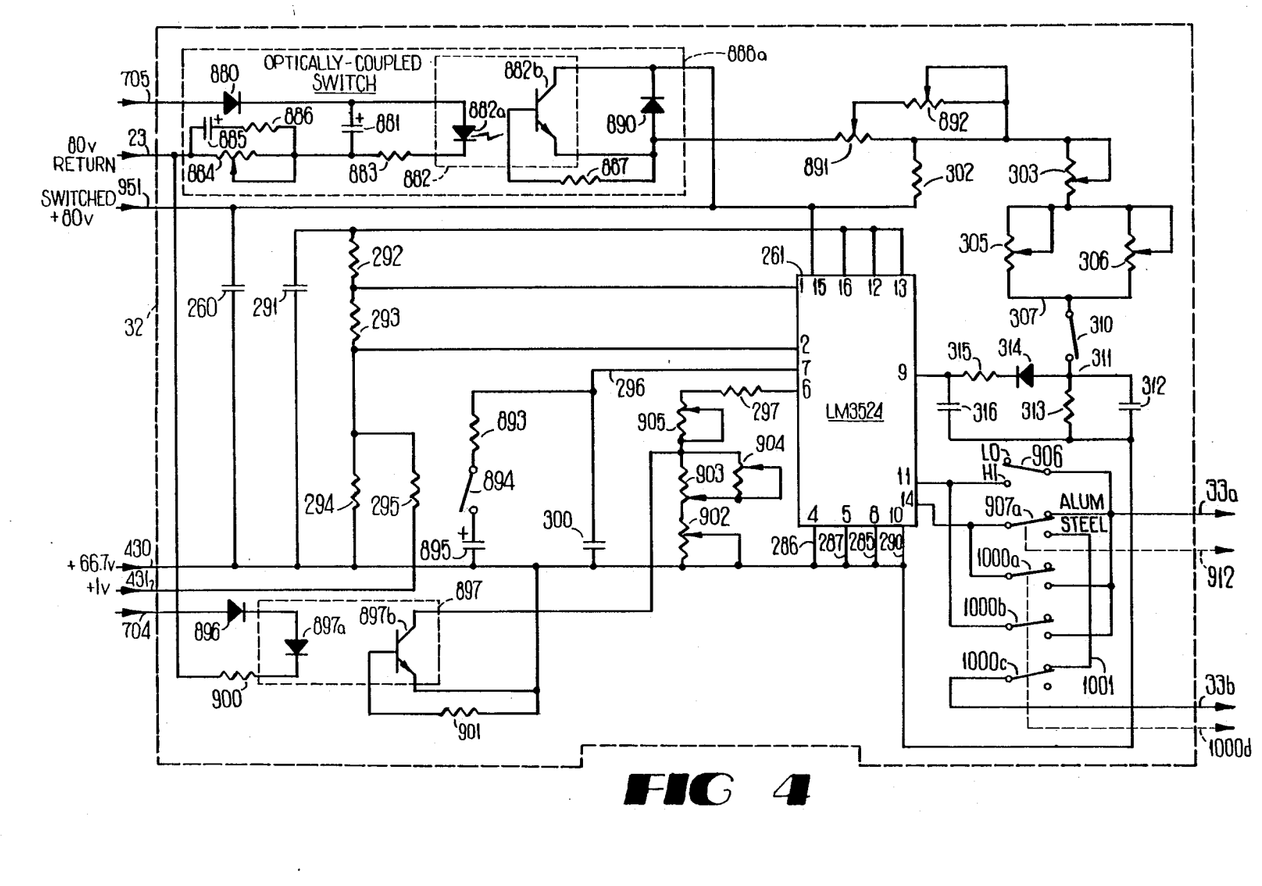
FIG. 4 is a schematic diagram of the low frequency pulse modulator.

Turn now to FIG. 4 which is a schematic diagram of the low frequency pulse width modulator. The basic construction and operation of the low frequency pulse width modulator are as described in the above mentioned U.S. Patent and U.S. patent application. The differences and improvements provided by the present invention are described below. The resistance and capacitance connected to pins 6 and 7, respectively, of integrated circuit 261 define the oscillation frequency for integrated circuit 261. Integrated circuit 261 is a regulating pulse width modulator which has an internal divider so that its outputs, on pins 11 and 14, are alternately active. Therefore, during one oscillation cycle, pin 11 will be active and, during the next oscillation cycle, pin 14 will be active.

Pin 11 is connected to the HI contact (shown open) of switch 906 and to the center contact of relay section 1000b. Pin 14 is connected to the center contact of switch 907a and to the center contact of relay section 1000a. The center contact of switch 906, the ALUM (aluminum) contact (shown closed) of switch section 907a, and the normally open contacts of relay sections 1000a and 1000b are all connected to conductor 33a. The STEEL contact (shown open) of switch section 907a is connected to the normally closed contact of relay section 1000c by conductor 1001. The center contact of relay section 1000c is connected to conductor 33b.

Figure 5:
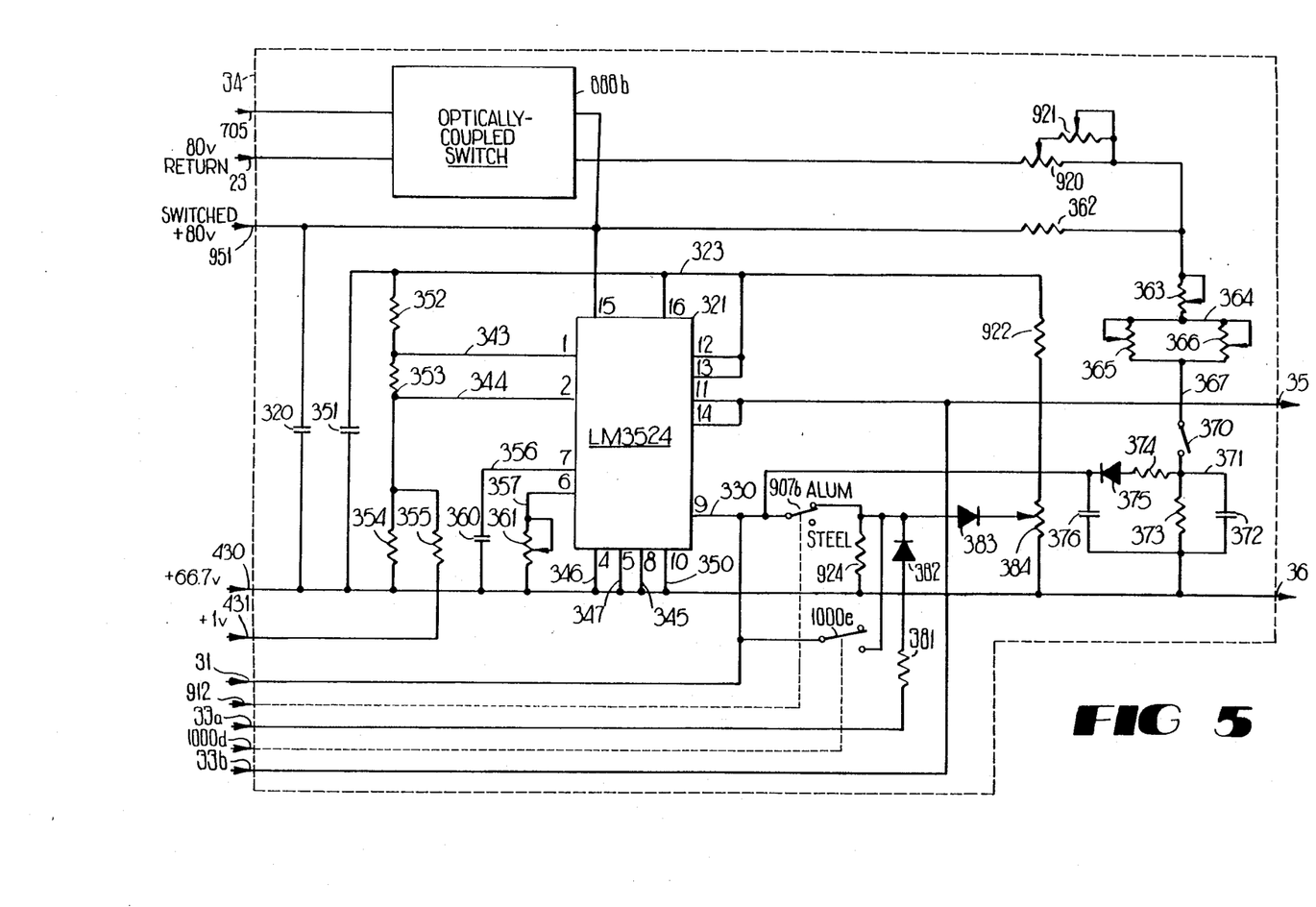
FIG. 5 is a schematic diagram of the high frequency pulse modulator.

Turn now to FIG. 5 which is a schematic diagram of the high frequency pulse width modulator. The basic construction and operation of high frequency pulse width modulator 34 are as described in the above mentioned U.S. Patent and U.S. patent application. The changes to modulator 34 primarily involve the addition of relay section 1000e. Integrated circuit 321 is also a regulating pulse width modulator with the two output pins 11 and 14 being connected in parallel to conductor 35. Input pin 9 of integrated circuit 321 controls the pulse width of the output pulses on pins 11 and 14. Pin 9 is connected by conductor 330 to conductor 31, the center contact of relay section 1000e, the center contact of switch section 907b, one end of capacitor 376, and the cathode of diode 375. The ALUM contact (shown closed) of switch section 907b is connected to one end resistor 924, the normally open contact of relay section 1000e, the cathode of diode 382 and the anode of diode 383. Conductor 33a is connected to the anode of diode 382 through resistor 381. Conductor 33b is connected to output pins 11 and 14 and conductor 35.

Considering FIGS. 4 and 5 together, assume first that switch 907 is in the ALUM position and that an arc has already been struck so that relay 1000 is not energized. Output pin 14 of integrated circuit 261 will be connected to switch section 907a, conductor 33a, resistor 381, diode 382, and switch section 907b to the pin 9 input of integrated circuit 321. Therefore, when the output on pin 14 of integrated circuit 261 is a logic 1 then integrated circuit 321 will be enabled and will produce output pulses on conductor 35. When the output of integrated circuit 261 on pin 14 is a logic 0 then integrated circuit 321 will be disabled and there will be not output pulses on conductor 35. If switch 906 is in the HI position then, since output pins 11 and 14 of integrated circuit 261 are connected in parallel, the repetition frequency of the logic 1's on conductor 33a will be twice that as when switch 906 is in the LO position (shown).

Assume that switch 906 (FIG. 4) is in the LO position (shown), that switch 370 (FIG. 5) is in the open position (shown), that switch 907 is in the STEEL position, and that the arc has already been struck so that relay 1000 is not energized. Output pin 14 of integrated circuit 261 will be connected by switch section 907a, conductor 1001, relay section 1001c, and conductor 33b to conductor 35. Note that switch section 907b prevents switch 906 from connecting output pin 11 of integrated circuit 261 to the pulse width control input 9 integrated circuit 321. Also, it will be recalled that switch 370 is in the open position and that relay 1000 is in the de-energized position. Therefore, the input to pin 9 of integrated circuit 321 will be a logic 0 and integrated circuit 321 will be disabled. Therefore, the pulses appearing on conductor 35 will be those due to output pin 14 of integrated circuit 261 of the low frequency pulse width modulator.

Assume now that the arc has not yet been struck so that relay 1000 is in the energized position. It will be seen that relay section 1000c isolates pin 14 of integrated circuit 261 from conductor 35, regardless of the position of switch section 907a, that relay sections 1000a and 1000b connect output pins 11 and 14 of integrated circuit 261 in parallel and to conductor 33a, regardless of the positions of switches 906 or 907, and that relay section 1000e connects conductor 33a to the control input pin 9 of integrated circuit 321 regardless of the position of switch 907b. Therefore, the paralleled outputs of integrated circuit 261 are used to control the operation of the high frequency pulse width modulator 321 so that the output on conductor 35 consists of a series of chopped pulses which are identical to those which would be obtained if switch 907 was placed in the ALUM position and switch 906 was placed in the HI position. Therefore, before the arc is struck, the signal on conductor 35 will always consist of a series of chopped pulses. After the arc has been struck and relay 1000 has been de-energized then the signal on conductor 35 will be that selected by the operator using switches 906 and 907. Stated another way, before the arc has been struck, the welder will always operate in the HI ALUM mode.

It will be appreciated that, during the pre-arc period, one may consider relay 1000 as doubling the output frequency of low frequency modulator 32 since there are now two pulses during the time period that was previously one pulse, or as increasing the output duty cycle since, again, there are now two pulses during the same time interval that there was previously only one pulse. Also, as explained in the above mentioned U.S. patent application, during the pre-arc period, optically-coupled switch 888a increases the width of each output pulse of integrated circuit 261 of the low frequency modulator 32 and switch 888b increases the width of each output pulse of integated circuit 321 of the high frequency modulator 34. Furthermore, during the pre-arc period, isolator 897 increases the pulse repetition frequency of integrated circuit 261 of low frequency modulator 32. Therefore, during the pre-arc period the driving signal on conductor 35 consists of a series of high duty cycle pulses, each pulse being chopped at a higher frequency and the chopping pulse having a high duty cycle. The higher duty cycles and pulse widths serve to increase the output voltage and assist in striking the arc, the higher chopping frequency increases the reactance of the inductors and provides additional protection against excessive transient currents, and the additional low pass filtering on the peak current detector serves to prevent the peak current detector from being tripped by a high value, short lived arc starting current. The result is an electronic arc welder with improved arc striking capabilities.

Figure 6:
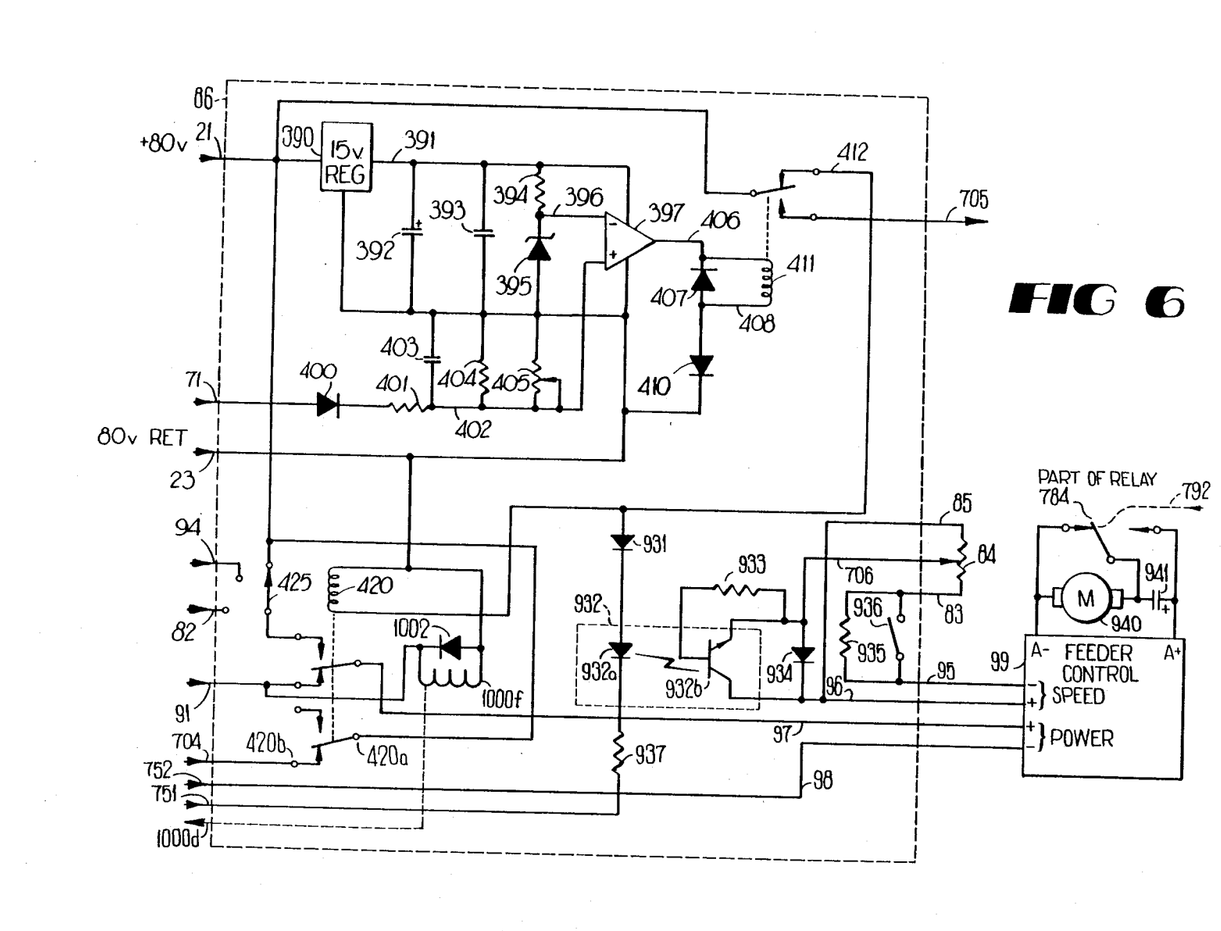
FIG. 6 is a schematic diagram of the high/low voltage switchover circuit.

Turn now to FIG. 6 which is a schematic diagram of the high/low voltage switchover circuit. The basic construction and operation of circuit 86 are as described in the above mentioned U.S. Patent and U.S. patent application. The addition to circuit 86 consists of relay 1000 and surge suppressing diode 1002. One end of relay coil 1000f and the anode of diode 1002 are connected to 80 volt return conductor 23. The other end of coil 1000f and the cathode of diode 1002 are connected to conductor 704. The welder output voltage, which is present on conductor 71, is monitored by comparator 397. Before the arc has been struck, the voltage on conductor 71 will be high thereby causing the voltage on conductor 402 to exceed the reference voltage on conductor 396. The output of comparator 397 will be high, thereby energizing relay 411 and opening the connection between 80 volt conductor 21 and conductor 412. This de-energizes relay 420 which, in turn, connects 80 volt conductor 21 to conductor 704 through relay contacts 420a and 420b. The 80 volts on conductor 704 then energizes relay 1000.

Assume now that the arc has been struck. The voltage on conductor 71 will drop down to the arc sustaining voltage. The voltage on conductor 402 will then be less than the predetermined reference voltage on conductor 396. The output of comparator 397 will therefore be low, which deenergizes relay 411. Relay 411 then connects 80 volt conductor 21 to conductor 412, which causes relay 420 to be energized. When relay 420 is energized it breaks the connection between 80 volt conductor 21 and conductor 704. This removes the plus 80 volts from coil 1000f, thereby de-energizing relay 1000.

It will be recalled that the operation of relay 1000 affects the operation of the low frequency pulse width modulator (FIG. 4) and high frequency pulse width modulator (FIG. 5) to increase the output frequency and/or duty cycle.

Figure 7A:
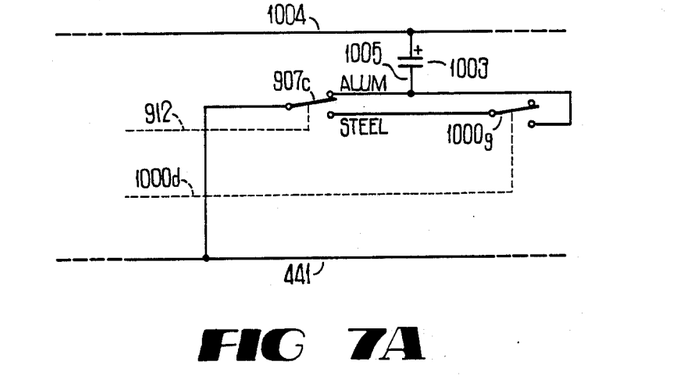
FIGS. 7A-7C are alternative embodiments for the control of the high frequency pulse modulator.
Figure 7B:
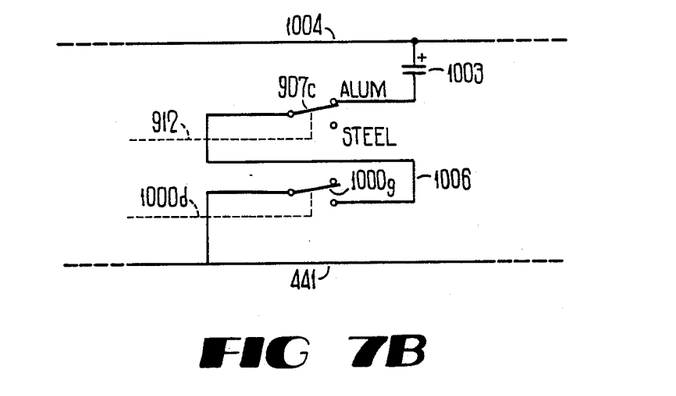
Figure 7C:
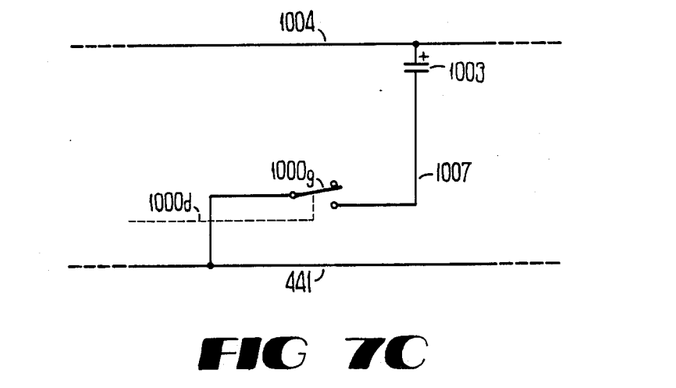

FIGS. 7A-7C are some alternative arrangements for switching the input bandwidth of the peak current detector of FIG. 3 and may be used instead of the switch 907c and capacitor 1003 arrangement shown in FIG. 3. In FIG. 7A, conductor 1004 is connected to the positive terminal of capacitor 1003. The negative terminal of capacitor 1003 is connected by conductor 1005 to the ALUM contact (shown) of switch section 907c and to the normally open contact of relay section 1000g. The center contact of relay section 1000g is connected to the STEEL contact (shown open) of switch section 907c. The center contact of switch section 907c is connected to conductor 441. Capacitor 1003 is connected into the circuit and reduces the input bandwidth of the peak current detector whenever switch 907 is in the ALUM position. However, it will be appreciated that the response time of the peak current detector (FIG. 3) is not as critical when switch 907 is in the ALUM position since the driving signal on conductor 35 is that generated by the high frequency pulse width modulator 34 (FIG. 5). The higher frequency provided by modulator 34 causes inductors 62 and 70 (FIG. 2) to have a higher reactance and limit the rate of increase of the output current so that peak current detector 80 can still respond in sufficient time to protect the driver transistors 56 (FIG. 2).

When switch 907 is in the STEEL position then capacitor 1003 is inserted into the input bandwidth circuit of the peak current detector only during the pre-arc period where relay 1000 is energized. Therefore, during the pre-arc period, the bandwidth of the peak current detector is reduced but the frequency of the drive signal is controlled by the high frequency modulator 34. Inductors 62 and 70, along with peak current detector 80, provide adequate protection.

In FIG. 7B conductor 1004 is again connected to the positive terminal of capacitor 1003. The negative terminal of capacitor 1003 is connected to the ALUM contact (shown closed) of switch section 907c. The center contact of switch 907c is connected by conductor 1006 to normally open contact of relay section 1000g. The center contact of relay section 1000g is connected to conductor 441. In this arrangement, capacitor 1003 is inserted into the input bandwidth circuit of the peak current detector only during the pre-arc period of an ALUM mode welding operation.

In FIG. 7C conductor 1004 is again connected to the positive terminal of capacitor 1003. The negative terminal of capacitor 1003 is connected by conductor 1007 to the normally open contact of relay section 1000g. The center contact of relay section 1000g is connected to conductor 441. In this arrangement, capacitor 1003 is inserted into the input bandwidth circuit of the peak current detector during the pre-arc period, regardless of whether the ALUM or the STEEL welding mode is selected.

The table below shows the correlation between the components of FIG. 1 and the components of FIG. 2.

| FIG. 1 COMPONENT | FIG. 1/FIG. 2 CORRELATION FIG. 2 COMPONENT(S) |
|---|---|
| Oscillator No. 1 (2000) | Low Freq. Pulse Modulator (32) |
| Oscillator No. 2 (2002) | High Freq. Pulse Modulator (34) |
| Inductor (2010a) | Inductors (62 & 70) |
| Output Current Sensor (2012) | Peak Current Detector (80) |
| Output Voltage Sensor (2017) | High/Low Voltage Switchover (86) |
| Relay (2003) | Relay (1000) (FIGS. 4,5,6 and 7) |
| Driver (2010) | Switching, Shutdown & Driver (37), Transistor Protection Circuit (707), Drivers (55a–55f), Shunts (50a–50d), Diode (61), Resistors (64 & 66), etc. |

From the figures and the detailed description above, it will be appreciated that the present invention describes a weld selector station having improved arc striking characteristics. Also, based upon the figures and the detailed description above, numerous variations and modifications to the present invention will become apparent to those skilled in the art. Therefore, the scope of the present invention is to be limited only by the claims below.

I claim:

1. An electronic welder with an improved capability for striking an arc, comprising:
   oscillation means for providing a first signal;
   chopping means for chopping said first signal to provide a chopped first signal;
   drive means responsive to a drive signal for providing an output voltage and an output current to a welding operation;
   switching means responsive to a second signal for providing a selected one of said first signal and said chopped first signal as said drive signal to said drive means; and
   sensing means responsive to said output voltage for providing said second signal;
   whereby said switching means provides said chopped first signal before said arc is struck and provides said first signal after said arc is struck.

2. The welder of claim 1 wherein said chopping means comprises a second oscillation means, said second oscillation means being active when said first signal is in a predetermined state.

3. The welder of claim 2 wherein said second signal causes said switching means to provide said chopped first signal when said output voltage exceeds a predetermined value.

4. The welder of claim 1 wherein said second signal causes said switching means to provide said chopped first signal when said output voltage exceeds a predetermined value.

5. The welder of claim 1 wherein said first signal has a first set of characteristics and said oscillation means is responsive to said second signal for providing said first signal with a second set of characteristics.

6. The welder of claim 5 wherein said first set of characteristics comprises a first frequency and said second set of characteristics comprises a second, higher frequency.

7. The welder of claim 6 wherein said first set of characteristics comprises a first duty cycle and said second set of characteristics comprises a second, larger duty cycle.

8. The welder of claim 5 wherein said second signal causes said oscillation means to provide said first signal with said second set of characteristics when said output voltage exceeds a predetermined value.

9. The welder of claim 1 and further comprising:
   current sensing means responsive to said output current for providing a third signal, which disables said drive means, when a characteristic of said output current exceeds a predetermined value.

10. The welder of claim 9 wherein said characteristic is the instantaneous value.

11. The welder of claim 9 and further comprising:
    means for reducing the bandwidth of said current sensing means;
    wherein said bandwidth reducing means is responsive to said second signal for reducing said bandwidth of said current sensing means when said output voltage exceeds a predetermined value.

12. An electronic welder with an improved capability for striking an arc, comprising:
    oscillation means for providing a first signal;
    chopping means for chopping said first signal to provide a chopped first signal;
    drive means responsive to a drive signal for providing an output voltage and an output current to a welding operation;
    switching means responsive to a second signal for providing a selected one of said first signal and said chopped first signal as said drive signal to said drive means; and
    sensing means responsive to said output current for providing said second signal;
    whereby said switching means provides said chopped first signal before said arc is struck and provides said first signal after said arc is struck.

13. The welder of claim 12 wherein said chopping means comprises a second oscillation means, said second oscillation means being active when said first signal is in a predetermined state.

14. The welder of claim 13 wherein said second signal causes said switching means to provide said first signal when said output current exceeds a predetermined value.

15. The welder of claim 12 wherein said second signal causes said switching means to provide said first signal when said output current exceeds a predetermined value.

16. The welder of claim 12 wherein said first signal has a first set of characteristics and said oscillation means is responsive to said second signal for providing said first signal with a second set of characteristics.

17. The welder of claim 16 wherein said first set of characteristics comprises a first frequency and said second set of characteristics comprises a second, higher frequency.

18. The welder of claim 16 wherein said first set of characteristics comprises a first duty cycle and said second set of characteristics comprises a second, larger duty cycle.

19. The welder of claim 16 wherein said second signal causes said oscillation means to provide said first signal with said second set of characteristics when said output current is less than a predetermined value.

20. The welder of claim 12 wherein said sensing means is further responsive to said output current for providing a third signal, which disables said drive means, when a characteristic of said output current exceeds a predetermined value.

21. The welder of claim 20 wherein said characteristic is the instantaneous value.

22. The welder of claim 20 and further comprising:
means for reducing the bandwidth of said sensing means;
wherein said bandwidth reducing means is responsive to said second signal for reducing said bandwidth of said sensing means when said output current is less than a predetermined value.

23. An electronic welder with an improved capability for striking an arc, comprising:
oscillation means for providing a first signal;
chopping means for chopping said first signal to provide a chopped first signal;
drive means responsive to a drive signal for providing an output voltage and an output current to a welding operation;
switching means responsive to a second signal for providing a selected one of said first signal and said chopped first signal as said drive signal to said drive means; and
sensing means for providing said second signal when said arc is present;
whereby said switching means provides said chopped first signal before said arc is struck and provides said first signal after said arc is struck.

24. The welder of claim 23 wherein said chopping means comprises a second oscillation means, said second oscillation means being active when said first active is in a predetermined state.

25. The welder of claim 24 wherein said second signal causes said switching means to provide said chopped first signal when said arc is absent.

26. The welder of claim 23 wherein said second signal causes said switching means to provide said chopped first signal when said arc is absent.

27. The welder of claim 23 wherein said first signal has a first set of characteristics and said oscillation means is responsive to said second signal for providing said first signal with a second set of characteristics.

28. The welder of claim 27 wherein said first set of characteristics comprises a first frequency and said second set of characteristics comprises a second, higher frequency.

29. The welder of claim 27 wherein said first set of characteristics comprises a first duty cycle and said second set of characteristics comprises a second, larger duty cycle.

30. The welder of claim 27 wherein said second signal causes said oscillation means to provide said first signal with said second of characteristics when said arc is absent.

31. The welder of claim 23 and further comprising:
current sensing means responsive to said output current for providing a third signal, which disables said drive means, when a characteristic of said output current exceeds a predetermined value.

32. The welder of claim 31 wherein said characteristic is the instantaneous value.

33. The welder of claim 31 and further comprising:
means for reducing the bandwidth of said current sensing means;
wherein said bandwidth reducing means is responsive to said second signal for reducing said bandwidth of said current sensing means when said arc is absent.

34. In an electronic welder containing a drive circuit having an output for providing an output voltage and an output current to a welding operation, a frequency setting circuit for setting the pulse repetition rate and the pulse width of said output voltage, said drive circuit containing at least one inductor in series with said output and a protection circuit for protecting said drive circuit in the event that a predetermined characteristic of said output current exceeds a predetermined value, an improvement for improving the arc starting characteristics of said electronic welder for starting an arc, comprising:
sensing means for providing a first signal when said arc is absent; and
disabling means responsive to said first signal for at least partially disabling said protection circuit;
wherein said protection circuit is at least partially disabled when said arc is absent so that said protection circuit is less responsive to arc starting transient currents.

35. The improvement of claim 34 wherein said protection circuit contains a filter having an upper cutoff frequency and said disabling means partially disables said protection circuit by reducing said upper cutoff frequeny of said filter.

36. The improvement of claim 34 wherein said protection circuit is responsive to the instantaneous value of said output current exceeding said predetermined value.

37. The improvement of claim 34 and further comprising:
switching means responsive to said first signal for causing said frequency setting circuit to shift to a higher pulse repetition rate.

38. The improvement of claim 34 and further comprising:
switching means responsive to said first signal for causing said frequency setting circuit to shift to a higher duty cycle.

39. The improvement of claim 34 and further comprising
chopping means responsive to said first signal for causing said output voltage to be chopped at a chopping frequency which exceeds said pulse repetition rate.

40. The improvement of claim 34 wherein said sensing means comprises voltage sensing means responsive to said output voltage.

41. The improvement of claim 40 wherein said voltage sensing means provides said first signal when said output voltage exceeds a predetermined value.

42. The improvement of claim 40 wherein said current sensing means provides said first signal when said output current is less than a predetermined value.

43. The improvement of claim 34 wherein said sensing means comprises current sensing means responsive to said output current.

44. For use with a low frequency pulse arc welder of the type comprising a low frequency oscillator having an output characterized by a pulse repetition rate and a pulse width, a driver circuit for providing an output voltage and an output current to a welding operation, and an inductor in series between said driver circuit and said welding operation, a method for improving the characteristics of said welder for starting an arc, comprising the steps of:
  (a) determining if said arc is present; and
  (b) if said arc is not present, then:
    (i) increasing at least a selected one of said pulse repetition rate and said pulse width; and
    (ii) chopping said output of said oscillator at a chopping rate exceeding said pulse repetition rate.

45. The method of claim 44 wherein, at step (b)(i), both said pulse repetition rate and said pulse width are increased.

46. The method of claim 44 wherein said welder further comprises an over-current protection circuit for at least partially disabling said driver circuit if a selected characteristic of said output current exceeds a predetermined value, and further comprising the step of:
  (b) (iii) reducing the sensitivity of said protection circuit to said selected characteristic of said output current.

47. The method of claim 46 wherein, at step (b)(i), both said pulse repetition rate and said pulse width are increased.

48. The method of claim 46 wherein said over-current protection circuit is responsive to the instantaneous value of said output current and said sensitivity is reduced by lowpass filtering a signal corresponding to said output current.

49. The method of claim 44 wherein said step (a) comprises:
  (i) monitoring said output voltage; and
  (ii) declaring said arc to be present if said output voltage is less than a predetermined value.

50. The method of claim 44 wherein said step (a) comprises:
  (i) monitoring said output current; and
  (ii) declaring said arc to be present if said output current is greater than a predtermined value.

* * * * *